(12) United States Patent
Scholl et al.

(10) Patent No.: US 7,716,780 B2
(45) Date of Patent: May 18, 2010

(54) WIPER DEVICE COMPRISING A FLAT WIPER BLADE AND WIPER ARM

(75) Inventors: Wolfgang Scholl, Gemmrigheim (DE); Andreas Fink, Grossbottwar (DE); Gerhard Schremmer, Bietigheim-Bissingen (DE); Heiko Ernstmeier, Bietigheim-Bissingen (DE)

(73) Assignee: Valeo Systemes d'Essuyage, Le Mesnil-Saint Denis (FR)

( * ) Notice: Subject to any disclaimer, the term of this patent is extended or adjusted under 35 U.S.C. 154(b) by 1232 days.

(21) Appl. No.: 10/508,282

(22) PCT Filed: Mar. 17, 2003

(86) PCT No.: PCT/EP03/02754

§ 371 (c)(1),
(2), (4) Date: Sep. 20, 2004

(87) PCT Pub. No.: WO03/080409

PCT Pub. Date: Oct. 2, 2003

(65) Prior Publication Data

US 2005/0177970 A1    Aug. 18, 2005

(30) Foreign Application Priority Data

Mar. 21, 2002    (DE) ................. 102 12 441

(51) Int. Cl.
*B60S 1/40*    (2006.01)
(52) U.S. Cl. ............. 15/250.32; 15/250.44; 15/250.352

(58) Field of Classification Search .............. 15/250.32, 15/250.33, 250.34, 250.352, 250.44
See application file for complete search history.

(56) References Cited

U.S. PATENT DOCUMENTS

| | | | |
|---|---|---|---|
| 4,348,782 A | | 9/1982 | Fournier |
| 5,807,016 A | * | 9/1998 | Herring et al. ............. 403/321 |
| 6,481,044 B1 | * | 11/2002 | Journee .................... 15/250.32 |
| 6,550,096 B1 | * | 4/2003 | Stewart et al. ........... 15/250.32 |
| 6,609,267 B1 | * | 8/2003 | Journee et al. ........... 15/250.32 |
| 6,966,096 B2 | * | 11/2005 | Baseotto et al. .......... 15/250.32 |
| 2005/0177970 A1 | * | 8/2005 | Scholl et al. ............. 15/250.32 |

FOREIGN PATENT DOCUMENTS

| | | |
|---|---|---|
| DE | 32 40 850 A1 | 5/1983 |
| EP | 0 301 822 A1 | 2/1989 |
| FR | 1 308 353 | 9/1962 |
| WO | WO-00/21811 | 4/2000 |
| WO | WO-01/15946 | 3/2001 |
| WO | WO-02/40328 A1 | 5/2002 |

* cited by examiner

*Primary Examiner*—Lee D Wilson
(74) *Attorney, Agent, or Firm*—Osha • Liang LLP

(57) ABSTRACT

A wiper device for wiping a vehicle windscreen, including a drivable wiper arm and a flat wiper blade arranged on the wiper arm. The flat wiper blade includes a wiper blade rubber, a support for supporting the wiper blade rubber, and a connection for connecting a free end of the wiper arm. The support is in the form of band-like elongate spring blades. The connection includes a support element fixedly arranged on the support and a connecting element that partially pivots the support element. The connecting element is releasably connected to the free end of the wiper arm.

21 Claims, 4 Drawing Sheets

WIPER DEVICE COMPRISING A FLAT WIPER BLADE AND WIPER ARM

FIELD OF THE INVENTION

The invention relates to a wiper device, in particular for wiping vehicle windscreens, having a drivable wiper arm and a flat wiper blade which can be arranged on the wiper arm, which flat wiper blade comprises a wiper blade rubber, support means which support the wiper blade rubber and may preferably be designed in the form of band-like elongate spring blades, and connecting means for connection to the free end of the wiper arm. The invention moreover relates to a wiper blade and a wiper arm of such a wiper device.

BACKGROUMD OF THE INVENTION

In such wiper devices, the support means, in particular two wall-like elongate spring blades which lie in longitudinal grooves of the wiper strip, ensure an optimal distribution of the wiper blade pressure, coming from the wiper arm, on the windscreen that is to be wiped. For this purpose, the support means are correspondingly bent forwards in the unloaded state, that is to say when the wiper blade is not bearing against the windscreen, and have a defined curvature. Such flat wiper blades consequently have no support and claw clip structure as has become known in varied form from the prior art.

DE 198 56 299 A1 discloses a wiper device as mentioned above. The connecting means of the flat wiper blade comprise a connecting element which is fixedly arranged on the flat wiper blade and has laterally protruding connecting pins. The connecting pins can be inserted into pin receivers arranged at the free end of the wiper arm, so that the flat wiper blade can be pivoted with respect to the wiper arm. In order to release the flat wiper blade from the wiper arm, the flat wiper blade is pivoted by 90°. In this position, the pivot pins can be guided out of the pin receivers, which are open on one side. Such a wiper device has the disadvantage that the pin receivers which form the pivotable mounting between wiper arm and flat wiper blade have to be provided at the free end of the wiper arm. This is associated with high technical outlay and thus with high costs. A further disadvantage is that the pivotable mounting, which is subject to wear, is part of the wiper arm.

SUMMARY OF THE INVENTION

It is therefore an object of the present invention to further develop a known wiper device as mentioned above such that a secure mounting of the flat wiper blade on the wiper arm is produced, wherein the mounting is to be designed to be as flat as possible, to be subject to low wear, to be cost-effective to produce and to be protected against environmental influences. Moreover, advantageous aerodynamics are to be achieved.

In order to achieve the abovementioned object, the invention proposes further developing a wiper device as mentioned above such that the connecting means comprise a support element which is fixedly arranged on the support means and a connecting element which is arranged such that it can partially pivot with respect to the support element, wherein the connecting element can be releasably connected to the free end of the wiper arm. In the wiper device according to the invention, the pivot mounting is consequently produced on the wiper blade side. The necessary pivotable mounting between flat wiper blade and wiper arm is completely integrated into the flat wiper blade. The free end of the wiper arm is rigidly connected to the connecting element, and the pivotable movement takes place between connecting element and support element. As a result, the height is kept very flat. Moreover, there is no need to provide any clearance between the wiper arm and the components of the flat wiper blade which can move relative to the wiper arm. Furthermore, the pivotable mounting can now be designed in a less expensive manner, since it is part of the replaceable part that is subject to wear, that is to say the flat wiper blade.

One advantageous embodiment of the invention is characterized in that the free end of the wiper arm preferably has a number of tongues which extend in the longitudinal direction and in the assembled state engage in tongue receivers provided on the connecting element. By means of such tongues and associated tongue receivers, a form-fitting connection of the free end of the wiper arm to the connecting element can be effected in a simple manner.

The tongues are in this case advantageously made in one piece with the free end and project at least partially in the direction towards the windscreen. As a result, the tongues do not have a disruptive effect either in the non-assembled state or in the assembled state of the flat wiper blade.

The connection of the wiper arm to the connecting element is in this case advantageously effected in the direction of the longitudinal axis of the wiper arm, wherein upon connection the tongues are received at least partially in a form-fitting manner by the tongue receivers. The tongues may in this case be designed such that they allow easier insertion into the tongue receivers and thus also act as a connection aid.

A further refinement of the invention is characterized in that the end face of the free end of the wiper arm in the assembled state bears at least partially in a form-fitting manner against a support edge of the connecting element. As a result, a defined position of the flat wiper blade with respect to the free end of the wiper arm is achieved. Preferably, the support edge is designed such that it follows the contour of the free end of the wiper arm and thus an essentially flat and aerodynamic surface is achieved.

Advantageously, the free end of the wiper arm has retaining sections that run essentially transversely to the longitudinal direction of the wiper arm and preferably essentially perpendicular to the windscreen, which retaining sections in the assembled state interact with actuating sections arranged on the connecting element, which actuating sections allow release of the wiper blade from the wiper arm upon actuation. In the assembled state, the free end of the wiper arm is thus held between in particular the support edge and the actuating sections in the longitudinal direction. Release in the direction perpendicular to the windscreen is not possible on account of the tongues present in the tongue receivers. The free end of the wiper arm is consequently arranged rigidly on the connecting element.

The retaining sections may advantageously be designed as retaining edges which in the assembled state are latched behind by the actuating sections such that a movement and release in the longitudinal direction of the connecting element with respect to the wiper arm is prevented. In order to assemble the flat wiper blade on the free end of the wiper arm, therefore, the tongues are inserted into the tongue receivers and the flat wiper blade is pushed onto the free end of the wiper blade until on the one hand the free end face of the wiper arm bears against the support edge in a form-fitting manner and on the other hand the actuating sections latch behind the retaining edges of the free end of the wiper arm.

In this case, the actuating sections advantageously do not project beyond the outer contour of the free end of the wiper arm. Preferably, the actuating sections adjoin the outer contour in a flush manner or are stepped back from the latter. As a result, undesired, inadvertent actuation of the actuating sections is ruled out.

In one preferred embodiment of the invention, the actuating sections are arranged at the free ends of spring tongues which in each case are arranged so that they extend in the longitudinal direction on opposite sides of the connecting element such that they are essentially parallel to the windscreen and can be actuated towards one another counter to a prestress force. This has the advantage that the actuating sections are provided in a space-saving, reliable and simple manner. Advantageously, in particular no further components are required.

One particularly preferred embodiment of the invention is characterized in that the free end of the wiper arm comprises a U-shaped section, the open side of which points in the direction of the windscreen that is to be wiped. This has the advantage that the connecting means of the flat wiper blade can be completely covered by the U-shaped section and are thus protected. Impurities can thus not readily adversely affect the pivotable arrangement of connecting element and support element.

Advantageously, in the assembled state the U-shaped section engages around or behind the connecting element at least partially in a form-fitting manner in order to receive transverse forces. In particular, the section of the U-shaped section which lies between the support edge of the connecting element and the actuating sections of the connecting element serves to receive transverse forces acting on the flat wiper blade.

The tongues are preferably arranged on the transverse web of the U-shaped section and the retaining sections are arranged on the legs of the U-shaped section. This allows relatively simple connection of the free end of the wiper blade to the connecting section.

One development of the invention is characterized in that the free end of the wiper arm and preferably the transverse web of the U-shaped section has at least one cutout in which the connecting element engages at least partially. As a result, additional stability of the connection between wiper arm and connecting element can be achieved.

Advantageously, the connecting element has a section that is essentially U-shaped in cross section, the legs of which engage around and/or behind the support element in the assembled state, wherein pivot means are arranged between the legs and the support element. Such a design has a relatively small height directed perpendicular to the windscreen. Nevertheless, sufficient pivotability between the support element and the connecting element is possible.

It may be provided that the connecting element or the support element has pivot pins which run transversely to the longitudinal direction and lie in a line, which pivot pins engage at least partially in pivot pin receivers provided on the support element or connecting element, for the ability to at least partially pivot. The pivot pins and associated pivot pin receivers consequently form the pivot means provided between the legs of the connecting element and the support element.

According to the invention, it is furthermore conceivable that the two legs of the connecting element and the support element have openings, in particular in the form of bores, which run transversely to the longitudinal direction and lie in a line, which openings receive a pivot pin for partial pivotability.

In order to reduce the number of individual parts of the wiper device, in a further embodiment of the invention it is provided that the support element is arranged directly on the support means. In this case, the support element may comprise for example receiving sections for receiving support means in the form of spring blades. In order to fix the support element to the spring blades, the support element may be joined to the spring blades, for example by means of welding, adhesive bonding, clamping or the like.

The abovementioned object is moreover achieved by a flat wiper blade and/or wiper arm of a device according to the invention.

BRIEF DESCRIPTION OF THE DRAWINGS

Further advantageous refinements and details of the invention can be found in the following description, in which the invention is described and explained in more detail with respect to the example of embodiment shown in the drawing, in which.

DETAILED DESCRIPTION

Figure 1:
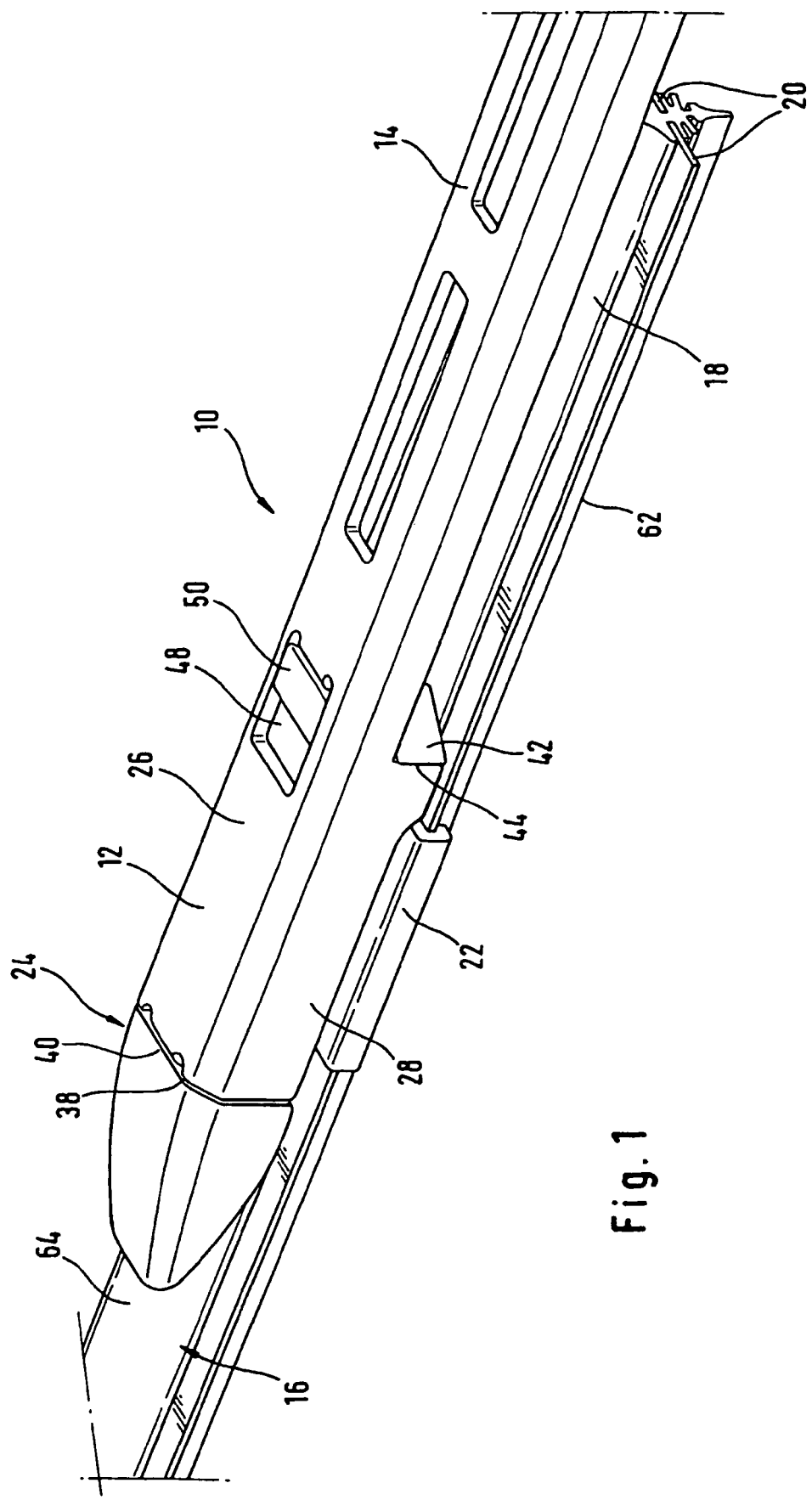
FIG. 1 shows a wiper device according to the invention in a perspective plan view.

FIG. 1 shows a wiper device 10 for wiping vehicle windscreens. Shown in the figure is the free end 12 of a drivable wiper arm 14 and the section of a flat wiper blade 16 which is connected to the free end 12 of the wiper arm 14. The flat wiper blade 16 consists of a wiper blade rubber 18, support means 20 which support the wiper blade rubber 18, a support element 22 which is arranged on the support means 20 and a connecting element 24 which is arranged such that it can partially pivot with respect to the support element 22. The support means 20 are designed in the form of two elongate spring blades which lie in corresponding longitudinal grooves of the wiper blade rubber 18.

Figure 5:
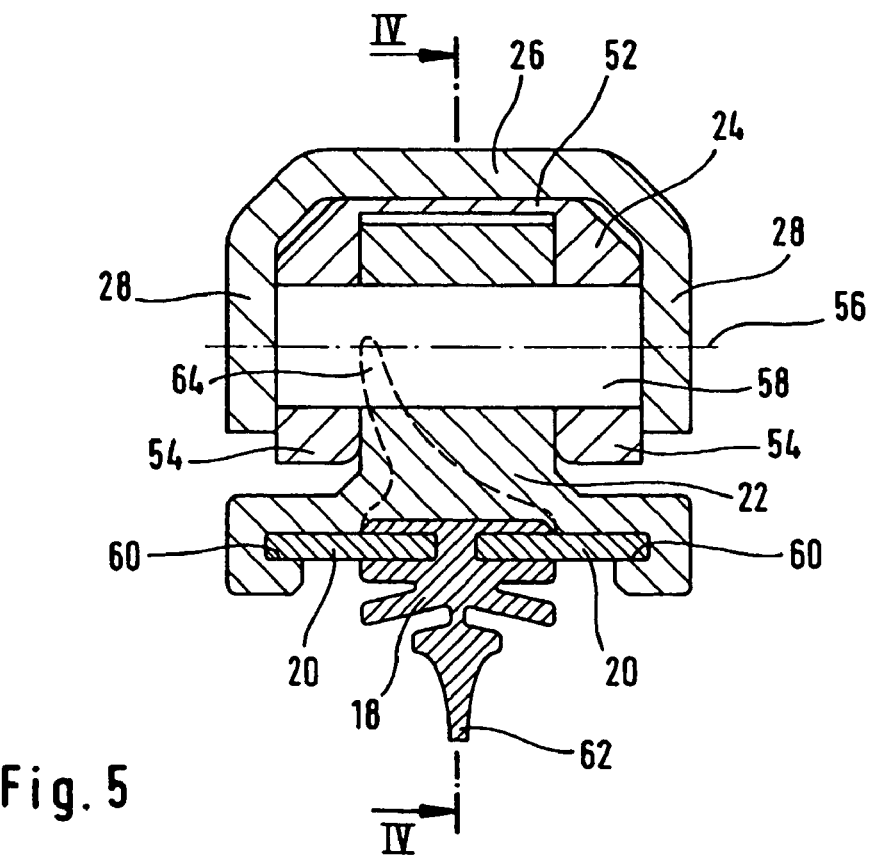
FIG. 5 shows a cross section through the wiper device shown in FIG. 1.

It can be seen from FIG. 1 and FIG. 5 that the free end 12 of the wiper arm 14 is designed in the shape of a U and has a transverse web 26 and two legs 28. In the assembled state shown in FIG. 1, the free end 12 of the wiper arm 14 engages around the connecting element 24 in an essentially form-fitting manner. As a result, transverse forces acting on the flat wiper blade 16 can be transmitted to the wiper arm 14.

Figure 3:
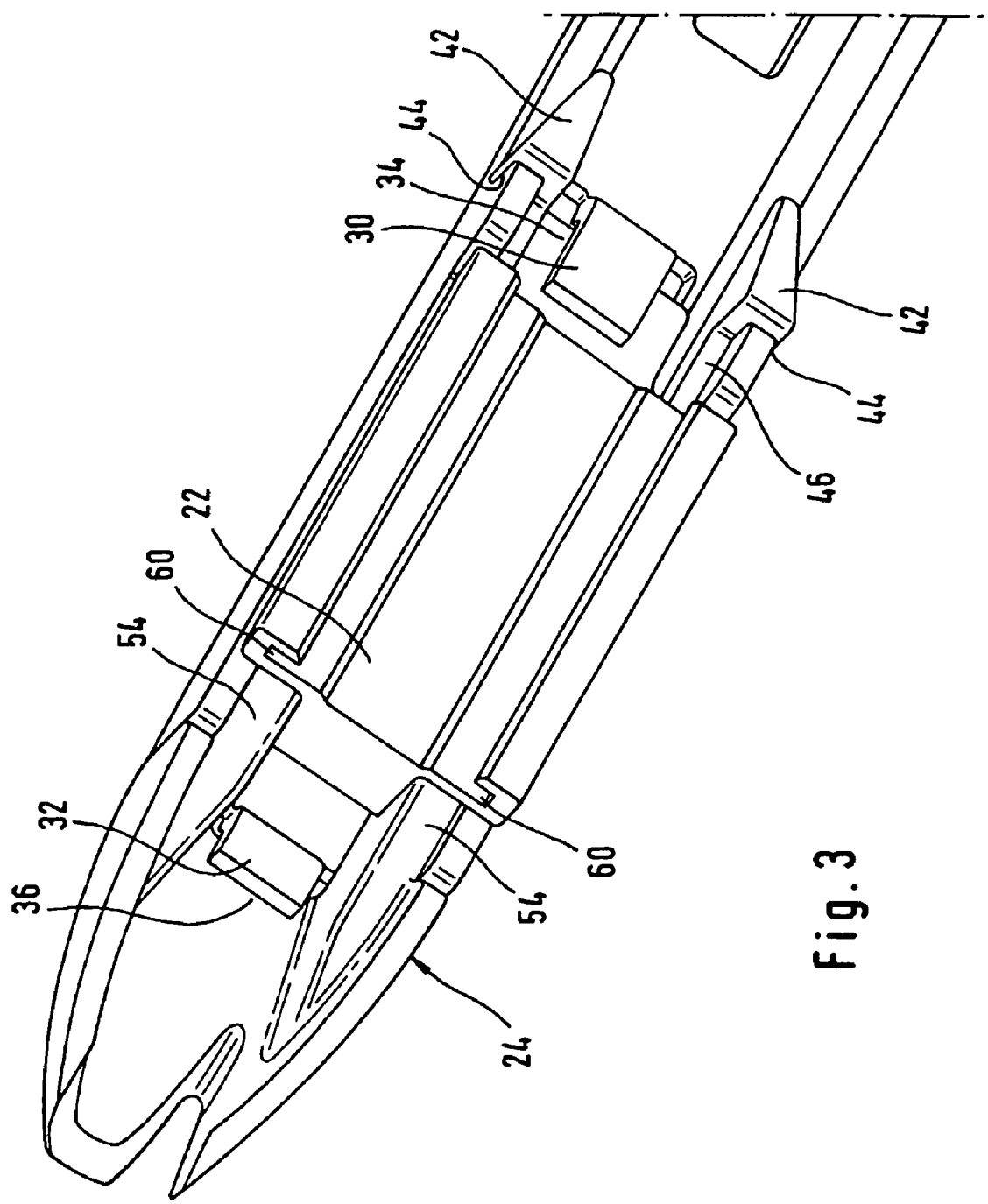
FIG. 3 shows a view from below of a wiper device according to the invention without a wiper blade rubber and without support means.

The free end 12 of the wiper arm 14 has on the transverse web 26 two tongues 30 and 32 which extend in the longitudinal direction, said tongues being made in one piece with the wiper arm 14 and projecting in the direction towards the windscreen or wiper blade rubber 18. The tongues 30 and 32 can be seen in particular in FIGS. 3 and 4. In FIG. 3, which shows a view of the wiper arm from below with the connecting element 24 and support element 22 arranged thereon, it can be clearly seen how the tongues 30 and 32 engage in tongue receivers 34 and 36 provided on the connecting element 24.

Figure 4:
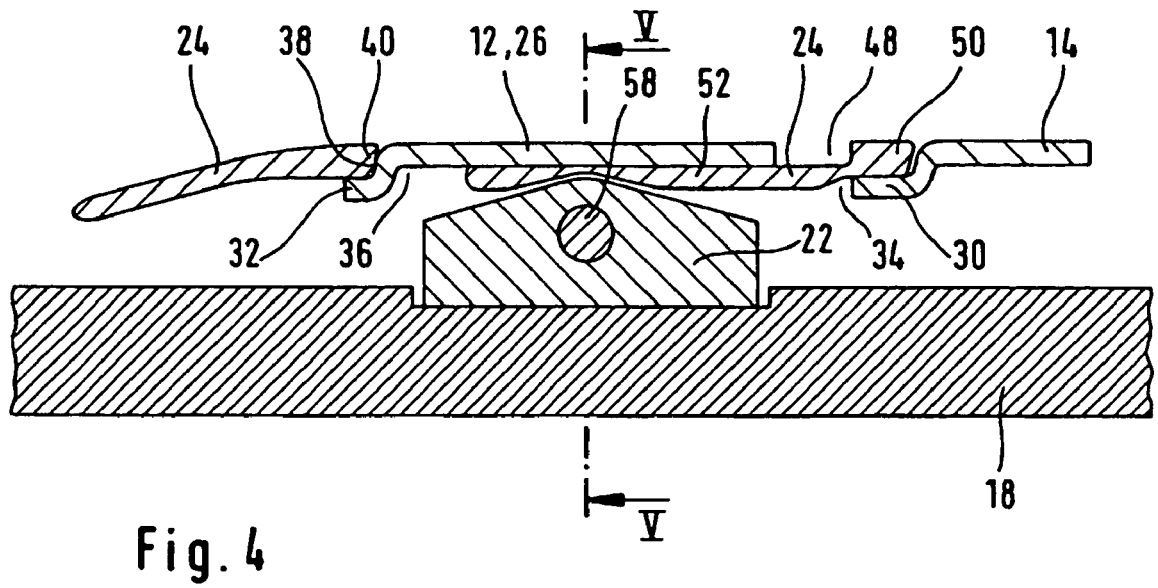
FIG. 4 shows a longitudinal section through the wiper device shown in FIG. 1.

It can be seen from FIG. 1 and FIG. 4 that in the assembled state the end face 38 of the free end 12 of the wiper arm 14 bears against a support edge 40 of the connecting element 24. In order to assemble the flat wiper blade 16 to the wiper arm 14, the two tongues 30 and 32 are consequently inserted into the two tongue receivers 34 and 36 and the connecting element 24 is pushed onto the free end 12 of the wiper arm 14 until the end face 38 bears against the support edge 40.

In the assembled position, two actuating sections 42 of the connecting element 24 latch behind retaining sections in the form of retaining edges 44 on the wiper arm. The retaining edges 44 run essentially transversely to the longitudinal direction of the wiper arm 14 and essentially perpendicular to the windscreen. The actuating sections 42 are in each case arranged at the free ends of two opposite spring tongues 46 which extend in the longitudinal direction. In order to release the flat wiper blade 16 from the wiper arm 14, the actuating sections 42 can be actuated towards one another counter to a prestress force, which results from the elasticity of the spring tongues 46. If the actuating sections 42 are pressed in the direction of the central longitudinal axis of the flat wiper blade 16, the flat wiper blade 16 can be removed from the wiper arm 14 in the longitudinal direction.

The distance between the end face 38 and the retaining edges 44 corresponds essentially to the distance between the support edge 40 and the regions of the actuating sections 42 which face the support edge 40 and latch behind the retaining edge 44. This ensures that the free end 12 of the wiper arm 14 securely latches to the connecting element 24.

Advantageously, the actuating sections do not project beyond the outer contour of the wiper arm 14.

Figure 2:
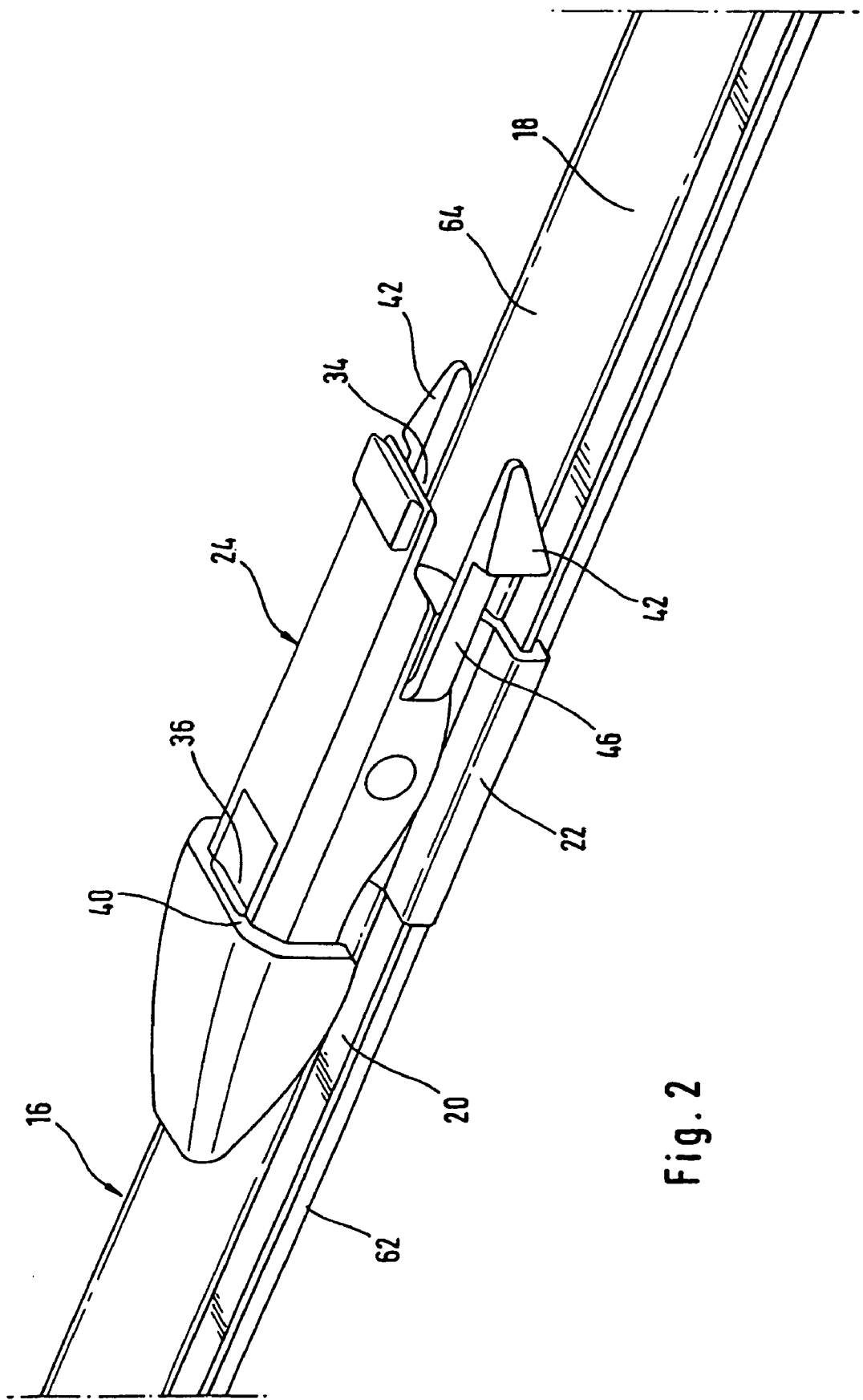
FIG. 2 shows the flat wiper blade of the wiper device shown in FIG. 1.

As can be seen in particular from FIGS. 2 and 3, the actuating sections 42 are designed in a wedge-like manner from below and in longitudinal section. This makes it easier to push the connecting element 24 onto the free end 12 of the wiper arm 14.

It can be seen from FIGS. 1 and 4 that the wiper arm 14 or transverse web 26 has a cutout 48 in which a section 50 of the connecting element 24 engages in the assembled state. The sides of the section 50 which run parallel to the longitudinal direction in this case lie flush against the inner sides of the cutout 48. As a result, the stability of the connection between the free end 12 of the wiper arm 14 and the connecting element 24 is improved.

As can be seen in particular from FIG. 5, the connecting element 24 is designed in a U-shaped manner in cross section with a transverse web 52 and two legs 54. The two legs 54 engage around the support element 22 in an essentially form-fitting manner. They and the support element 22 have a bore that runs along an axis 56, within which bore a pivot pin 58 is arranged. As a result, a pivotable mounting between the connecting element 24 and the support element 22 is achieved. The support element 22 furthermore has two receiving grooves 60 which lie opposite one another and are designed to receive the longitudinal sides of the spring blades that form the support means 20, said longitudinal sides facing away from one another. Various means may be used in order to fix the spring blades 20 in the receiving grooves 60, for example fixing screws, fixing bolts, adhesives, welding means or the like. It can be seen from FIG. 5 that the wiper blade rubber 18 has a wiper strip 62 which faces the windscreen that is to be wiped-and a spoiler-like projection 64 which faces away from the wiper strip 62.

All the features shown in the description, the claims which follow and the drawing may be essential to the invention both individually and in any desired combination with one another.

The invention claimed is:

1. A wiper device for wiping a vehicle windscreen, comprising:
 a drivable wiper arm; and
 a flat wiper blade arranged on the wiper arm,
 wherein the flat wiper blade comprises:
  a wiper blade rubber,
  support means for supporting the wiper blade rubber, wherein the support means is in the form of band-shaped elongate spring blades, and
  connecting means for connecting to a free end of the wiper arm, wherein the connecting means comprise a support element fixedly arranged on the support means, and a connecting element which is configured to partially pivot the support element, and
 wherein the connecting element is releasably connected to the free end of the wiper arm, and
 wherein the free end of the wiper arm comprises at least two tongues which extend in a longitudinal direction and, in the assembled state, engage with corresponding tongue receivers provided on the connecting element.

2. The wiper device as claimed in claim 1, wherein the number of tongues are made in one piece with the free end of the wiper arm and project at least partially in the direction towards the windscreen.

3. The wiper device as claimed in claim 1, wherein the connection of the wiper arm to the connecting element is effected in the direction of a longitudinal axis of the wiper arm, and wherein the tongues are received by the tongue receivers.

4. The wiper device as claimed in claim 3, wherein the connection of the wiper arm to the connecting element is effected in the direction of the longitudinal axis of the wiper arm, and wherein the tongues are received by the tongue receivers.

5. The wiper device as claimed in claim 1, wherein an end face of the free end of the wiper arm, in the assembled state, bears at least partially in a form-fitting manner against a support edge of the connecting element.

6. The wiper device as claimed in claim 1, wherein the free end of the wiper arm has retaining sections that run transversely to a longitudinal direction of the wiper arm and perpendicular to the windscreen, wherein the retaining sections, in the assembled state, interact with actuating sections arranged on the connecting element, and wherein the actuating sections allow for release of the wiper blade from the wiper arm upon actuation.

7. The wiper device as claimed in claim 6, wherein the retaining sections are designed as retaining edges which, in the assembled state, are latched behind by the actuating sections to prevent movement of the connecting element with respect to the wiper arm.

8. The wiper device as claimed in claim 7, wherein the actuating sections do not project beyond the outer contour of the free end of the wiper arm.

9. The wiper device as claimed in claim 8, wherein the actuating sections are arranged at free ends of spring tongues, each of which are arranged to extend in the longitudinal direction on opposite sides of the connecting element, parallel to the windscreen, and wherein the spring tongues are actuated towards one another counter to a pre-stress force.

10. The wiper device as claimed in claim 7, wherein the actuating sections are arranged at free ends of spring tongues, each of which are arranged to extend in the longitudinal direction on opposite sides of the connecting element, parallel to the windscreen, and wherein the spring tongues are actuated towards one another counter to a pre-stress force.

11. The wiper device as claimed in claim 6, wherein the actuating sections are arranged at free ends of spring tongues, each of which are arranged to extend in the longitudinal direction on opposite sides of the connecting element, parallel to the windscreen, and wherein the spring tongues are actuated towards one another counter to a pre-stress force.

12. The wiper device as claimed in claim 1, wherein the free end of the wiper arm comprises a U-shaped section, the open side of which points in the direction of the windscreen.

13. The wiper device as claimed in claim 12, wherein, in the assembled state, the U-shaped section engages around and behind the connecting element, at least partially in a form-fitting manner, to receive transverse forces.

14. The wiper device as claimed in claim 13, wherein a number of tongues are arranged on a transverse web of the U-shaped section, and the retaining sections are arranged on the legs of the U-shaped section.

15. The wiper device as claimed in claim 12, wherein a number of tongues are arranged on a transverse web of the U-shaped section, and the retaining sections are arranged on the legs of the U-shaped section.

16. The wiper device as claimed in claim 12, wherein the free end of the wiper arm and the transverse web of the U-shaped section have at least one cutout in which the connecting element partially engages.

17. The wiper device as claimed in claim 1, wherein the connecting element has a section that is U-shaped in cross section, the legs of which engage around and behind the support element in the assembled state, wherein pivot means are arranged between the legs of the U-shaped section and the support element.

18. The wiper device as claimed in claim 1, wherein one of the connecting element and the support element comprises pivot pins which run transversely to the longitudinal direction and lie in a line so as to allow at least a partial pivot of the one of the connecting element and the support element, wherein the pivot pins engage at least partially with pivot pin receivers provided on the one of the support element and connecting element.

19. The wiper device as claimed in claim 18, wherein legs of the connecting element and the support element comprise openings which run transversely to the longitudinal direction and lie in a line, wherein the openings receive a pivot pin.

20. The wiper device as claimed in claim 18, wherein legs of the connecting element and the support element comprise openings which run transversely to the longitudinal direction and lie in a line, wherein the openings receive a pivot pin.

21. The wiper device as claimed in claim 1, wherein the support element is arranged directly on the support means.

* * * * *